US012797886B2

(12) United States Patent
Stuber et al.

(10) Patent No.: US 12,797,886 B2
(45) Date of Patent: Nov. 17, 2026

(54) VALVE ASSEMBLY

(71) Applicant: Precision Planting LLC, Tremont, IL (US)

(72) Inventors: Luke Stuber, Tremont, IL (US); Timothy Schwind, Eureka, IL (US); Dillon Sloneker, Danvers, IL (US)

(73) Assignee: Precision Planting LLC, Tremont, IL (US)

( * ) Notice: Subject to any disclaimer, the term of this patent is extended or adjusted under 35 U.S.C. 154(b) by 137 days.

(21) Appl. No.: 18/718,109

(22) PCT Filed: Jan. 4, 2023

(86) PCT No.: PCT/IB2023/050057
§ 371 (c)(1),
(2) Date: Jun. 10, 2024

(87) PCT Pub. No.: WO2023/135492
PCT Pub. Date: Jul. 20, 2023

(65) Prior Publication Data

US 2025/0058344 A1 Feb. 20, 2025

Related U.S. Application Data

(60) Provisional application No. 63/266,694, filed on Jan. 12, 2022.

(51) Int. Cl.
*B05B 15/658* (2018.01)

(52) U.S. Cl.
CPC .................................. *B05B 15/658* (2018.02)

(58) Field of Classification Search
CPC .. B05B 15/658; A01M 7/006; F16K 11/0853; F16K 27/003
See application file for complete search history.

(56) References Cited

U.S. PATENT DOCUMENTS

| | | | | | |
|---|---|---|---|---|---|
| 753,730 | A * | 3/1904 | Owen | B05B 1/18 | 239/565 |
| 3,735,928 | A * | 5/1973 | Watts | B05B 15/658 | 285/305 |
| 3,863,841 | A * | 2/1975 | Berthoud | B05B 1/14 | 239/536 |
| 3,957,082 | A * | 5/1976 | Fuson | A61M 39/223 | 604/80 |
| 4,456,180 | A * | 6/1984 | Lury | B05B 15/658 | 239/586 |

(Continued)

FOREIGN PATENT DOCUMENTS

| | | | |
|---|---|---|---|
| EP | 0124599 | B1 | 9/1987 |
| WO | 2015037928 | A1 | 3/2015 |

OTHER PUBLICATIONS

European Patent Office, International Search Report related to International Patent Application No. PCT/IB2023/050057, mail date May 2, 2023, 12 pages.

*Primary Examiner* — Joseph A Greenlund

(57) ABSTRACT

A valve assembly having a valve body having in inlet, an outlet, a first opening, and a second opening; a connection bracket connected to the valve body adjacent to the inlet and configured for connection to a fluid line; a cap; and a valve; wherein the cap and the valve are interchangeably connectable to the first opening and the second opening.

6 Claims, 2 Drawing Sheets

(56) References Cited

U.S. PATENT DOCUMENTS

| | | | | | |
|---|---|---|---|---|---|
| 5,125,578 | A * | 6/1992 | Ballu | A01M 7/006 239/394 |
| 6,749,134 | B2 * | 6/2004 | Arenson | B05B 1/1645 239/394 |
| 7,066,402 | B2 * | 6/2006 | Goebel | B05B 1/306 239/444 |
| 10,189,031 | B2 * | 1/2019 | Funseth | A01M 7/0089 |
| 10,462,985 | B2 | 11/2019 | Wilger | |
| 11,470,834 | B2 * | 10/2022 | Price | A01M 7/0089 |
| 12,667,860 | B2 * | 6/2026 | Price | A01M 7/006 |
| 2002/0190140 | A1 * | 12/2002 | Arenson | B05B 1/3006 239/391 |
| 2007/0093764 | A1 | 4/2007 | Guerrero | |
| 2015/0367358 | A1 * | 12/2015 | Funseth | A01G 25/16 239/562 |
| 2018/0099167 | A1 * | 4/2018 | Dafoneseca | A62C 35/62 |
| 2021/0176977 | A1 * | 6/2021 | Bremer | B05B 12/08 |
| 2022/0220751 | A1 * | 7/2022 | Dvorak | B05B 15/652 |
| 2023/0403997 | A1 * | 12/2023 | Holmes | A01G 25/09 |
| 2023/0405625 | A1 * | 12/2023 | Price | B05B 15/16 |
| 2024/0165646 | A1 * | 5/2024 | Jain | B05B 1/16 |
| 2024/0237615 | A1 * | 7/2024 | Venturoso | A01K 15/025 |
| 2025/0058344 | A1 * | 2/2025 | Stuber | B05B 15/658 |

* cited by examiner

VALVE ASSEMBLY

CROSS-REFERENCE TO RELATED APPLICATIONS

This application is a national phase entry under 35 U.S.C. § 371 of International Patent Application PCT/IB2023/050057 filed Jan. 4, 2023, designating the United States of America and published in English as International Patent Publication WO 2023/135492 A1 on Jul. 20, 2023, which claims priority to U.S. Provisional Application No. 63/266,694, filed Jan. 12, 2022, all of which are incorporated herein by reference in their entireties.

FIELD

Embodiments of the present disclosure relate generally to valve assemblies for sprayer booms.

BACKGROUND

Valve bodies are attached to fluid lines on sprayer booms. The valve bodies have a valve to control flow of fluid into the valve body and out of the valve body to a nozzle. Valves are disposed perpendicular to the valve body. Because of spacing issues with valves extending away from valve bodies, valve bodies have to be reoriented so all the valve bodies to fit on the sprayer. As equipment is added, valve bodies may need to be removed and reoriented to accommodate equipment.

BRIEF SUMMARY

In an aspect of the invention there is provided a valve assembly comprising a valve body having in inlet, an outlet, a first opening, and a second opening; a connection bracket connected to the valve body adjacent to the inlet and configured for connection to a fluid line; a cap; and a valve; wherein the cap and the valve are interchangeably connectable to the first opening and the second opening.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention/disclosure will now be described, by way of example only, with reference to the accompanying drawings, in which.

DETAILED DESCRIPTION

Figure 1:
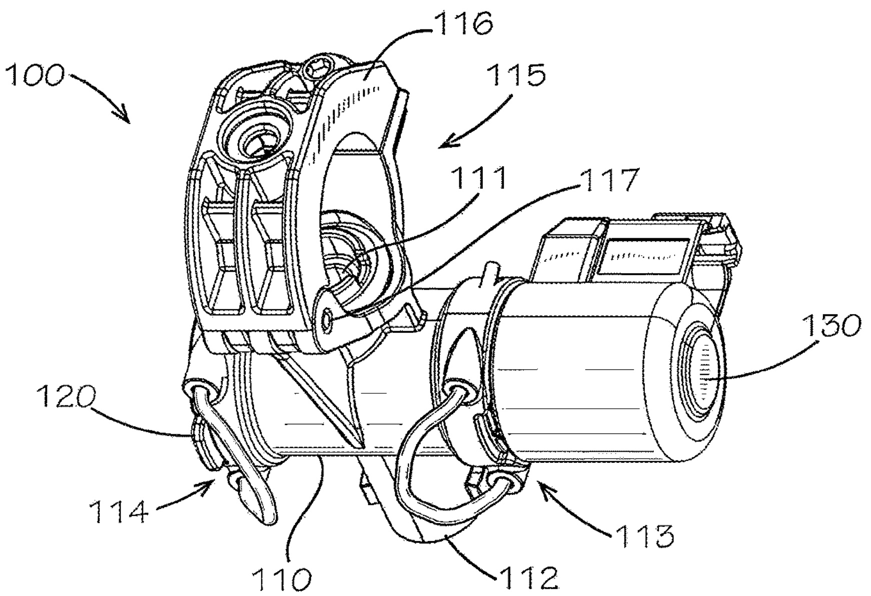
FIG. 1 is a perspective view of a valve assembly.
Figure 2:
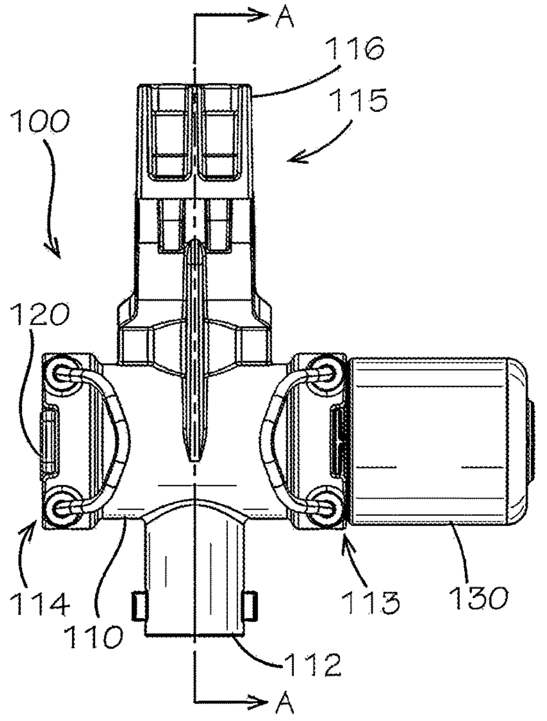
FIG. 2 is a rear elevation view of the valve assembly of FIG. 1.
Figure 3:
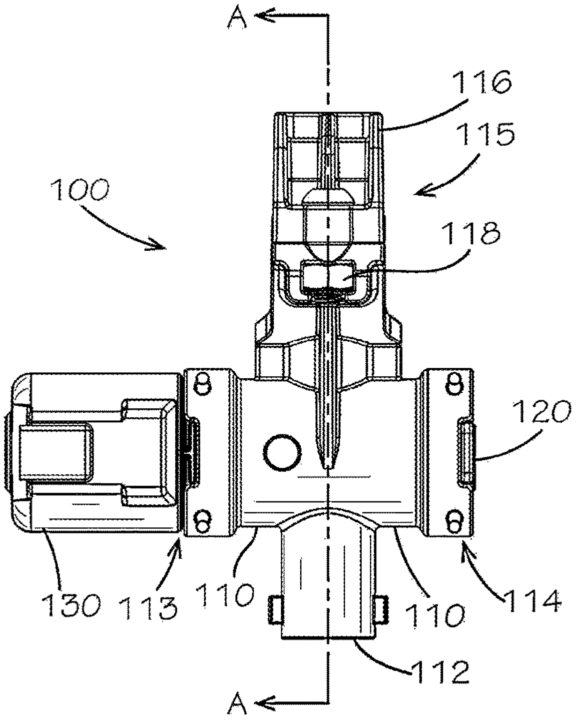
FIG. 3 is a front elevation view of the valve assembly of FIG. 1.
Figure 4:
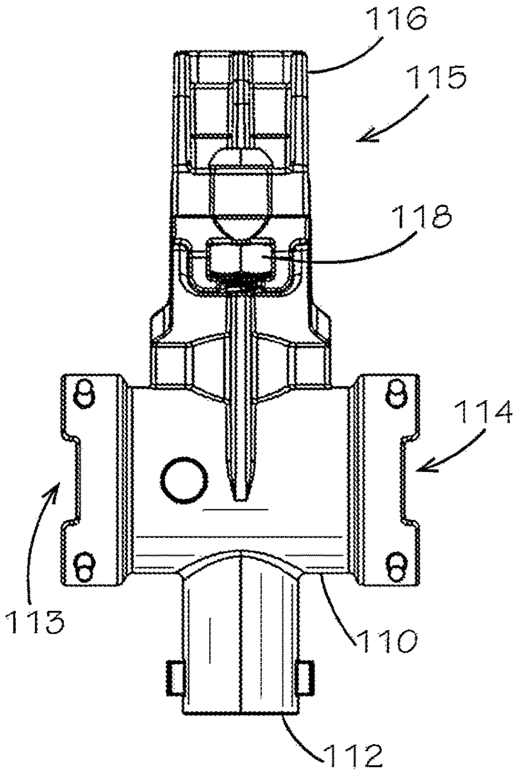
FIG. 4 is a front elevation view of the valve assembly of FIG. 1 with the cap and valve removed.
Figure 5:
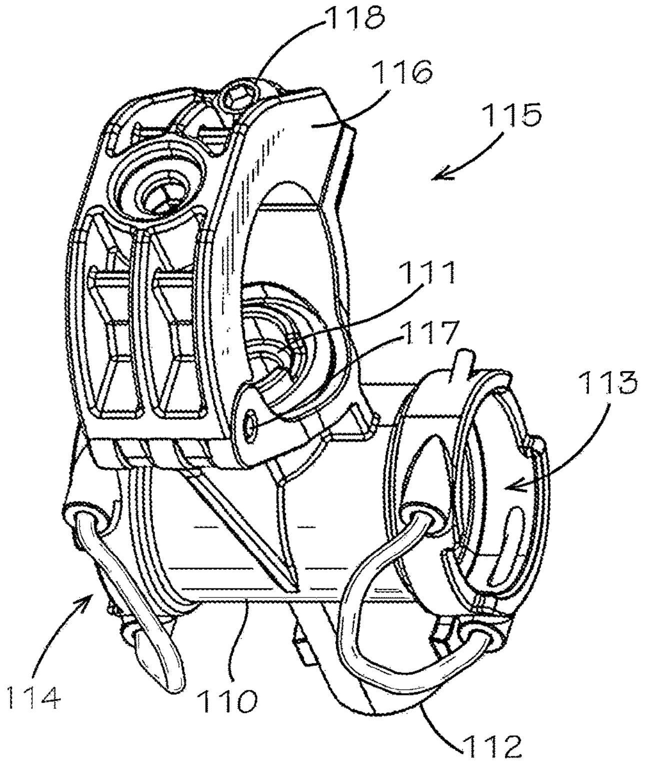
FIG. 5 is a perspective view of the valve assembly of FIG. 1 with the cap and valve removed.
Figure 6:
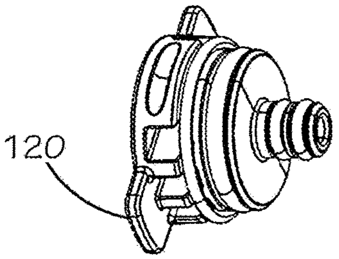
FIG. 6 is a perspective view of the cap of the valve assembly of FIG. 1.
Figure 7:
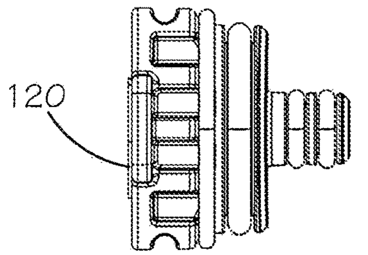
FIG. 7 is a side elevation view of the cap of FIG. 6.
Figure 8:
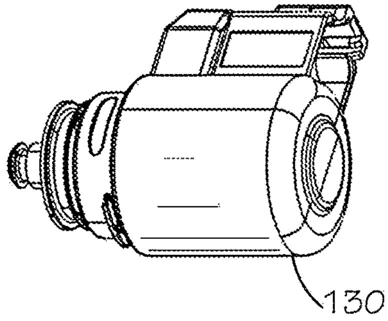
FIG. 8 is a perspective view of the valve of the valve assembly of FIG. 1.
Figure 9:
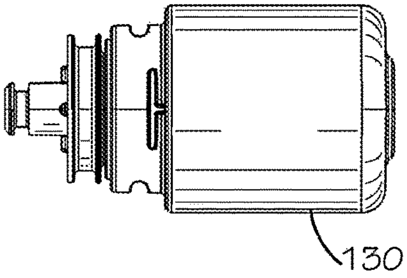
FIG. 9 is a side elevation view of the valve of FIG. 8.

All references cited herein are incorporated herein in their entireties. If there is a conflict between definitions herein and in an incorporated reference, the definition herein shall control.

A valve assembly 100 having a valve body 110 having in inlet 111, an outlet 112, a first opening 113, and a second opening 113; a connection bracket 115 connected to the valve body 110 adjacent to the inlet 111 and configured for connection to a fluid line; a cap 120; and a valve 130; wherein the cap 120 and the valve 130 are interchangeably connectable to the first opening 113 and the second opening 114. Cap 120 and valve 130 are interchangeable with each other and either can be connected to valve body 110 through first opening 113 or second opening 114. This permits valve assembly 100 to remain in place on a fluid line on a sprayer boom but still accommodate equipment by having the valve be inserted into the first opening 113 or second opening 114 for which ever one has space for the valve to be connected.

First opening 113 and second opening 114 can be opposite each other on valve body 110. First opening 113 and second opening 114 are transverse to the opening 111 and outlet 112. Inlet 111 and outlet 112 can be opposite each other on valve body 110.

In one embodiment, connection bracket 115 can have an upper bracket 116 that is hingeably connected through a pivot 117 to valve body 110. The hinge 117 allows connection bracket 115 to open and then connect around a fluid line. Upper bracket 116 can then be secured with a fastener 118 to valve body 110.

In another embodiment, valve body 110 can have mirror symmetry along line A-A, which is a line through the center of valve body 110 with first opening 113 and second opening 114 being perpendicular to line A-A.

What is claimed is:

1. A valve assembly comprising:

a valve body having an inlet, an outlet, a first opening, and a second opening;

a connection bracket connected to the valve body adjacent to the inlet and configured for connection to a fluid line;

a single cap; and a single valve;

wherein the cap and the valve are interchangeably connectable to the first opening and the second opening, wherein when the cap is connected to the first opening and the valve is connected to the second opening there is no valve in or connected to the first opening and there is no cap in or connected to the second opening, wherein when the cap is connected to the second opening and the valve is connected to the first opening there is no valve in or connected to the second opening and there is no cap in or connected to the first opening, and wherein the valve is configured such that when it is connected to the first opening or the second opening the valve is outboard of the valve body.

2. The valve assembly of claim 1, wherein the connection bracket comprises an upper bracket hingeably connected to the valve body.

3. The valve assembly of claim 1, wherein the first opening and second opening are transverse to the inlet and outlet.

4. The valve assembly of claim 1, wherein the first opening and second opening are opposite each other on the valve body.

5. The valve assembly of claim 1, wherein the inlet and outlet are opposite each other on the valve body.

6. The valve assembly of claim 1, wherein the valve body has mirror symmetry along a line through a center of the valve body with the first opening and second opening being perpendicular to the line.

* * * * *